United States Patent [19]

Sorimachi

[11] Patent Number: 4,746,790

[45] Date of Patent: May 24, 1988

[54] METHOD AND APPARATUS FOR MEASURING A DISTANCE

[75] Inventor: Kanehiro Sorimachi, Yokohama, Japan

[73] Assignee: Canon Kabushiki Kaisha, Tokyo, Japan

[21] Appl. No.: 97,426

[22] Filed: Sep. 16, 1987

Related U.S. Application Data

[63] Continuation of Ser. No. 796,313, Nov. 8, 1985, abandoned.

[30] Foreign Application Priority Data

Nov. 12, 1984 [JP] Japan .................. 59-236837

[51] Int. Cl.$^4$ .................................................. G01J 1/36
[52] U.S. Cl. .................................... 250/201; 354/408; 356/4
[58] Field of Search ................ 250/201 PF, 204; 354/406, 407, 408; 356/1, 4

[56] References Cited

U.S. PATENT DOCUMENTS 4,469,939  9/1984  Utagawa .............................. 250/204

Primary Examiner—Eugene R. LaRoche
Assistant Examiner—David Mis
Attorney, Agent, or Firm—Fitzpatrick, Cella, Harper & Scinto

[57] ABSTRACT

There is disclosed a method for measuring the distance to an object, using an apparatus having two optical systems which have optical axes parallel with each other, and detecting means on which images are respectively formed by the two optical systems, comprising the steps of:

(a) obtaining correlation between illumination distributions of object images formed on the two detecting means;

(b) changing the positional relationships between the respective optical systems and detecting means on the basis of the correlation obtained in the step (a);

(c) obtaining positional relationship between the two optical systems and the two detecting means when a desired correlation is obtained in steps (a) and (b); and (d) obtaining the distance between an object and said apparatus on the basis of the desired positional relationship obtained in the step (c).

7 Claims, 6 Drawing Sheets

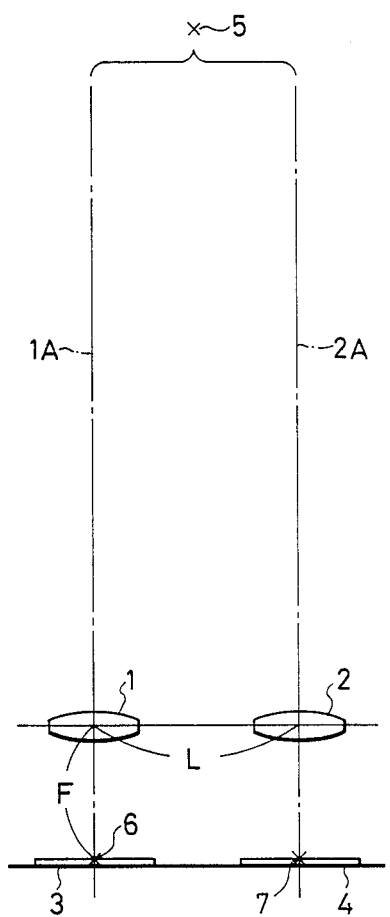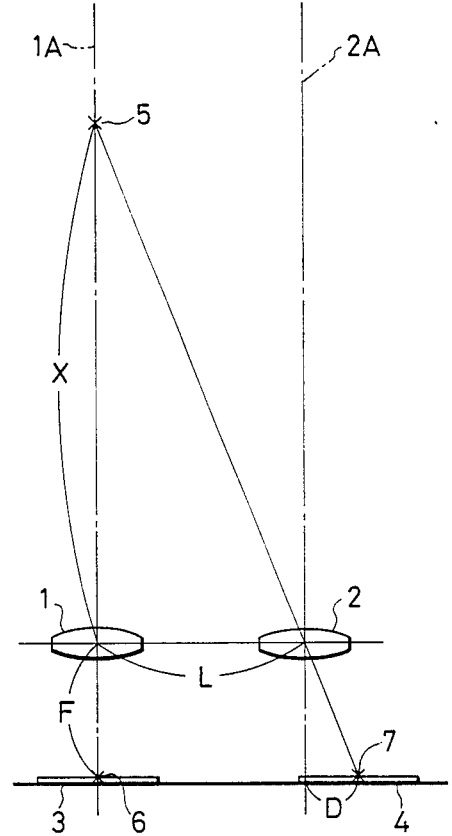

METHOD AND APPARATUS FOR MEASURING A DISTANCE

This application is a continuation of application Ser. No. 796,313 filed Nov. 8, 1985, now abandoned.

BACKGROUND OF THE INVENTION

1. Field of the Invention

The present invention relates to a method and apparatus for measuring a distance, and more particularly to a method and apparatus for optically measuring a distance to an object.

2. Description of the Prior Art

Measurement of a distance from a measuring device to an object is used for various purposes. For example, in a self-running robot, the distance is measured to recognize a surrounding environment. The robot can run while it avoids confrontation with an article based on the measured information.

The distance may be optically measured. One method thereof is a so-called stereoscopic method. This method is briefly explained below.

FIG. 1B illustrates a principle of the stereoscopic method. Numerals 101 and 102 denote lenses having the same focal distance, and numerals 101A and 102A denote optical axes thereof. The lenses 101 and 102 are arranged such that the optical axes 101A and 102A are parallel to each other and a line (base line) connecting centers of the lenses is orthogonal to the optical axes 101A and 102A. Measuring means 103 is arranged behind the lens 101 at a position spaced by the focal distance F of the lens 101, and measuring means 104 is arranged behind the lens 102 at a position spaced by the focal distance F. The measurement means 103 and 104 are arranged on a line which is parallel to the base line of the lenses 101 and 102.

In FIG. 1A, an object 105 to be measured is at an infinite point on the optical axis 101A. In this case, an image 106 of the object 105 on the measurement means 103 by the lens 101 exists on the optical axis 101A, and an image 107 of the object 105 on the measurement means 104 by the lens 102 exists on the optical axis 102A.

In FIG. 1B, the object 105 is at a point on the optical axis 101A spaced from lens 101 by a definite distance X. In this case, the image 106 of the object 105 on the measurement means 103 by the lens 101 exists on the optical axis 101A but the image 107 of the object 105 on the measurement means 104 by the lens 102 exists at a point spaced from the optical axis 102A.

Accordingly, by detecting a deviation D of the image 107 from the optical axis 102A by the measurement means, the distance X to be measured can be calculated in accordance with the following formula based on a distance F between the lenses 101 and 102 and the measurement means 103 respectively and 104, and the base line length L.

$$X = \frac{F \cdot L}{D} \quad (1)$$

Since the object to be measured usually has an extension, or finite depth, an image is formed over a certain range on the measurement means. As a result, it is difficult to specify the image at the same point on the same object. In the above stereoscopic method, in order to determine the positions of the images 106 and 107 by the measurement means 103 and 104, an illumination distribution in one measurement means 103 is correlated to an illumination distribution in the other measurement means 104.

FIGS. 2A, 2B and 2C illustrate a principle of the correlation method.

The measurement means 103 and 104 may be CCD arrays which are self-scan type sensors. As is well known, the CCD array comprises a number of finely segmented photo-sensing elements of approximately 10 $\mu$m, and can produce an electrical signal representing a degree of illumination of the image detected by the photo-sensing elements, as a time-serial signal in a predetermined sequence.

In FIG. 2A, a CCD array 103 which is the measurement means for the lens 101 has n photo-sensing elements, and a CCD array 104 which is the measurement means for the lens 102 has m photo-sensing elements (m>n). When a distance to the object on the optical axis 101A is to be measured, the image 106 formed by the lens 101 exists on the optical axis 101A regardless of the distance to the object but the image 107 formed by the lens 102 changes its position depending on the distance to the object. Accordingly, the CCD array 104 has more photo-sensing elements than the CCD array 103. In this arrangement, the CCD array 103 is called a standard view field and the CCD array 104 is called a reference view field.

In the arrangement of FIG. 2A, illumination distributions of the standard view field and the reference view field are shown in FIG. 2B. Since a focusing relationship of the object 105 and the image 106 in the optical axis direction to the lens 101 is equal to a focusing relationship of the object 105 and the image 107 on the optical axis direction to the lens 102 (magnifications are equal), the illumination distribution of the image 106 and the illumination distribution of the image 107 are different from each other only in the displacement D.

Accordingly, the CCD arrays 103 and 104 time-serially produce outputs of the photo-sensing elements as shown in FIG. 2C.

In order to correlate the outputs of the two CCD arrays, differences between outputs $S_1$–$S_n$ of first to n-th photo-sensing elements in the standard view field and corresponding outputs $R_1$–$R_n$ of first to n-th photo-sensing elements in the reference view field are determined.

$$COR_1 = \sum_{k=1}^{n} (S_k \sim R_k)$$

Similarly, differences between the outputs $S_1$–$S_n$ of the first to n-th photo-sensing elements in the standard view field and corresponding outputs $R_2$–$R_{n+1}$ of the second to (n+1)th photo-sensing elements in the reference view field are determined.

$$COR_2 = \sum_{k=1}^{n} (S_k \sim R_{k+1})$$

Similarly, $$COR_{m-n+1} = \sum_{k=1}^{n} (S_k \sim R_{k+m-n})$$

is determined.

Of the (m−n+1) values thus determined, the COR number of the smallest value (theoretically zero) is selected and it is multiplied by the width of one photo-sensing element of the CCD array to determine the distance D.

In the determination of the distance D by the correlation method, the standard view field of a certain size and the reference view field larger than the standard view field are necessary.

As seen from the above description, when the distance measurement is to be done over a wide range from an infinite to a near distance, the CCD array for the reference view field is large and requires a large number of photo-sensing elements because the distance D is large in the near distance measurement. This makes the signal processing complex in the correlation method.

SUMMARY OF THE INVENTION

It is an object of the present invention to provide a method and apparatus for measuring a distance, which resolve the problems encountered in the prior art.

It is another object of the present invention to provide a method of measuring the distance to an object, using an apparatus having two optical systems which have optical axes parallel with each other, and detecting means on which images are respectively formed by said two optical systems comprising; the steps of;

(a) obtaining correlation between illumination distributions of object images formed on said two detecting means;

(b) changing the positional relationships between the respective optical systems and corresponding detecting means on the basis of the correlation obtained in the step (a);

(c) obtaining a positional relationship between said two optical systems and said two detecting means when a desired correlation is obtained in the steps (a) and (b) and (d) obtaining the distance between an object and said apparatus on the basis of the desired positional relationship obtained in the step (c).

It is another object of the present invention to provide an apparatus for measuring a distance, comprising:
  a first optical system;
  a second optical system having an optical axis parallel with an optical axis of said first optical system;
  first detecting means on which an object image is formed by said first optical system;
  second detecting means on which an object image is formed by said second optical system;
  first means for changing the positional relationships between said first and second optical systems and said first and second detecting means, respectively to obtain correlation between illumination distributions of said object images formed on said first and second detecting means and to obtain the positional relationships between said first and second optical systems and said first and second detecting means when a desired correlation is obtained; and
  second means for obtaining a distance between said object and said apparatus on the basis of the positional-relations obtained by said first means.

BRIEF DESCRIPTION OF THE DRAWINGS

FIGS. 3A and 3B show a distance measurement method of the present invention.

DESCRIPTION OF THE PREFERRED EMBODIMENTS

Figure 1A:
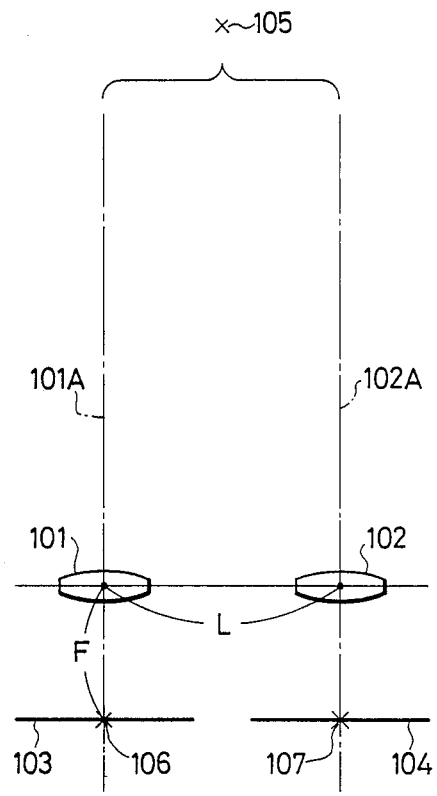
FIGS. 1A, 1B, 2A, 2B and 2C illustrate a principle of distance measurement in a so-called stereoscopic method.
Figure 1B:
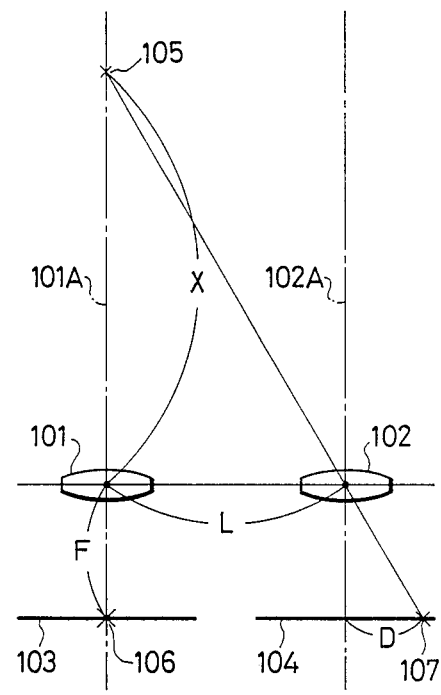
Figure 2A:
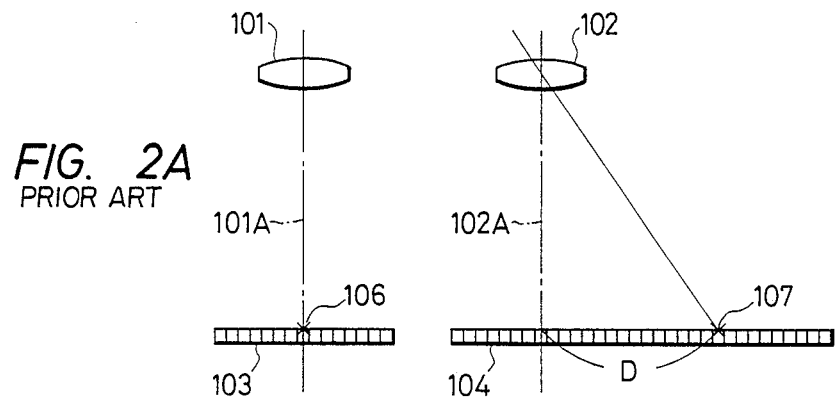
Figure 2B:
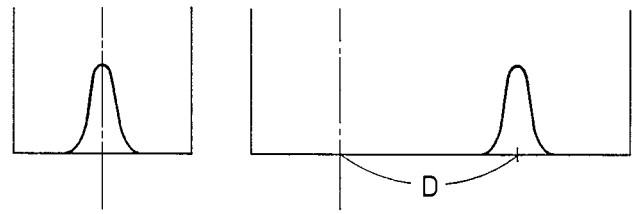
Figure 2C:
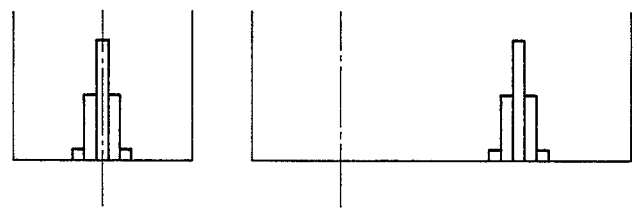

FIGS. 3A and 3B show one embodiment of the measurement method of the present invention. Numerals 1 and 2 denote lenses having the same focal distance, and numerals 1A and 2A denote the optical axes thereof. The lenses 1 and 2 are arranged such that the optical axes 1A and 2A are parallel to each other and a base line is orthogonal to the optical axes 1A and 2A. Numerals 3 and 4 denote illumination distribution measurement means such as CCD arrays for the lenses 1 and 2, respectively, each of which comprises N photo-sensing elements. The CCD arrays 3 and 4 are spaced from the lenses 1 and 2 by the focal distance F of the lenses 1 and 2, respectively, and arranged on a line parallel to the base line of the lenses.

FIG. 3A shows an original arrangement. An object 5 to be measured is at an infinite point on the optical axis 1A. Images 6 and 7 of the object 5 on the CCD arrays 3 and 4 by the lenses 1 and 2 exist on the optical axes 1A and 2A, respectively. In the arrangement of FIG. 3A, the center photo-sensing elements, that is, the (N/2)th photo-sensing elements from the left ends of the CCD arrays 3 and 4 are on the optical axes 1A and 2A, respectively. In this arrangement, the illumination distributions of the two CCD arrays 3 and 4 are identical.

In FIG. 3B, the object 5 is spaced by a definite distance X on the optical axis 1A. For the arrangement of the lenses 1 and 2 and the CCD arrays 3 and 4 shown in FIG. 3A, the illumination distributions of the CCD arrays 3 and 4 would not be identical. Therefore, in FIG. 3B, the CCD array 4 is moved in a direction normal the optical axis 2A little by little and the matching of the illumination distributions of the two CCD arrays 3 and 4 is detected during the movement. As shown in FIG. 3B, the illumination distributions of the CCD arrays 3 and 4 match each other when the image 7 of the object 5 is focused on the (N/2)th photo-sensing element from the left end of the CCD array 4.

Accordingly, by measuring the displacement D of the CCD array 4 from the initial position to the position at which the illumination distributions match each other, the distance X can be calculated based on the displacement D because the displacement D is proportional to the deviation of the images 6 and 7 from the optical axes 1A and 2A.

Figure 4:
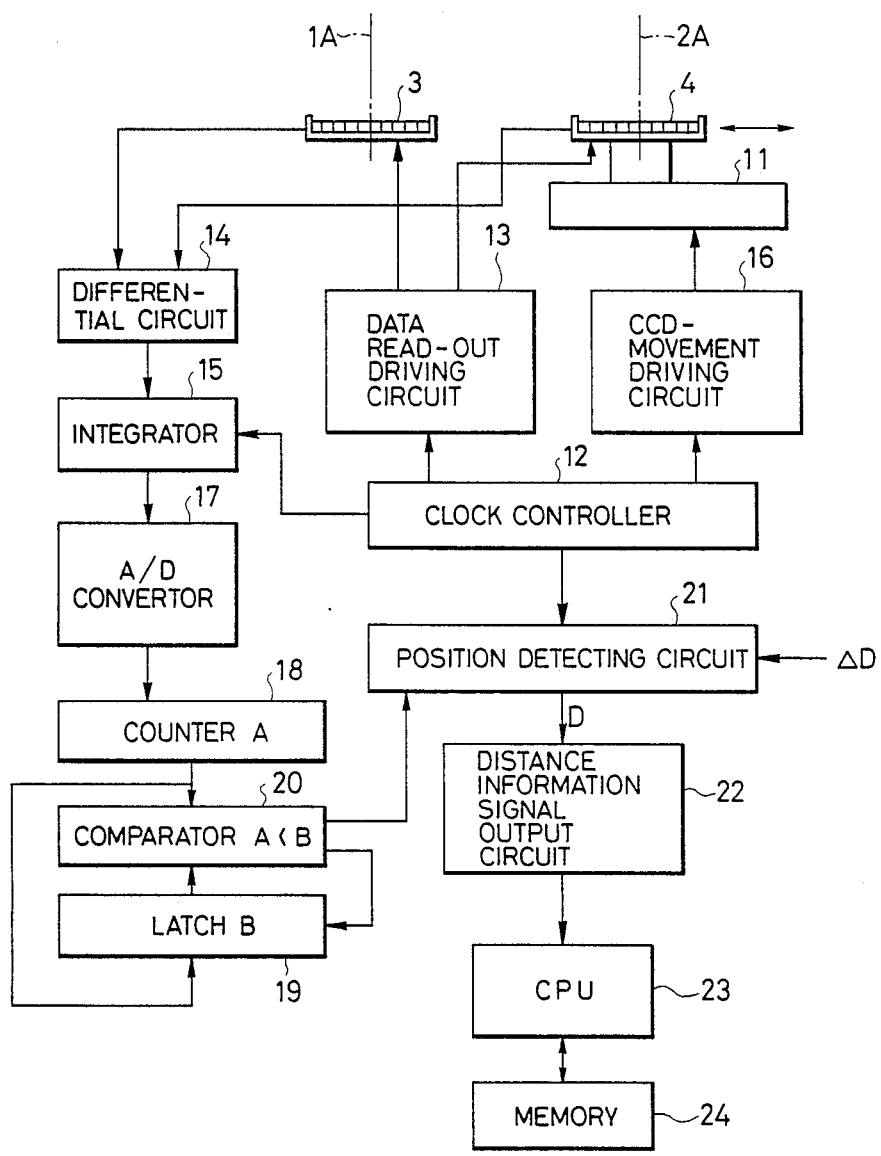
FIG. 4, is a block diagram of an apparatus used in the measurement method of the present invention.

FIG. 4 is a block diagram of a signal processor used to practice the present distance measurement method. Numerals 3 and 4 denote the CCD arrays having the same number of photo-sensing elements. Numerals 1A and 2A denote the optical axes of the lenses, not shown. One CCD array 3 is fixed in position while the other CCD array 4 is movable in a direction normal to the optical axis 2A by a drive unit 11. Data readout of the CCD arrays 3 and 4 is driven by a clock control circuit 12 and a drive circuit 13, and the analog data from the CCD arrays 3 and 4 are time-serially supplied to a differential circuit 14 where a time-serial differential signal of the corresponding photo-sensing elements of the CCD arrays 3 and 4 is formed. This differential signal is supplied to an integrator 15.

After the data have been read out while the CCD arrays 3 and 4 are fixed, the drive unit 11 is activated by the clock control circuit 12 and a CCD movement drive circuit 16 so that the CCD array 4 is moved in a direction normal to the optical axis 2A to the right by a small distance ΔD (for example, a distance corresponding to the width of a photo-sensing element of the CCD array). The integrator 15 produces the integrated output as the CCD array is moved, and then the integrator 15 is cleared. The integrator 15 has been initially cleared. The output from the integrator 15 is supplied to an A/D converter 17 where it is converted to a digital signal. The output of the A/D converter 17 is counted by a counter 18 and the count thereof is latched in a latch 19. The latch 19 has been initially cleared.

After the movement of the CCD array 4, the data of the CCD arrays 3 and 4 are read out in similar manner, and the above operation is repeated.

Numeral 20 denotes a comparator which compares an input data A from the counter 18 with a data B from the latch 19, and only if A<B, it updates the data B of the latch by the data A so that the latch 19 holds the data A as the new data B. A matching position detection circuit 21 counts the number of times of movement of the CCD 4. When and only when the comparison result is A<B, the comparator 20 supplies an output to the matching position detection circuit 21. Thus, the detection circuit 21 latches the number of times of movement each time it receives the output from the comparator 20. Finally, the number of times of movement at which the output of the A/D converter 17 is minimum, that is, the integrated output of the integrator 15 is minimum is obtained.

The incremental distance ΔD of the CCD array 4 is supplied to the matching position detection circuit 21, and the number of times for the minimum integrated output, multiplied by ΔD represents the distance (D in FIG. 3B) which the CCD array 4 has been moved before the highest matching of the illumination distribution in the CCD arrays 3 and 4 is reached.

The distance D outputted by the matching position detection circuit 21 is supplied to a distance information signal output circuit 22, which calculates the distance X to the object in accordance with the formula (1). The distance information is supplied to a CPU 23 and stored in a memory 24.

In the present embodiment, only one of the two CCD arrays is moved in a direction normal to the optical axis. Alternatively, the two CCD arrays may be moved. In such case, a formula for calculating the distance is different from that of the present embodiment.

Figure 5:
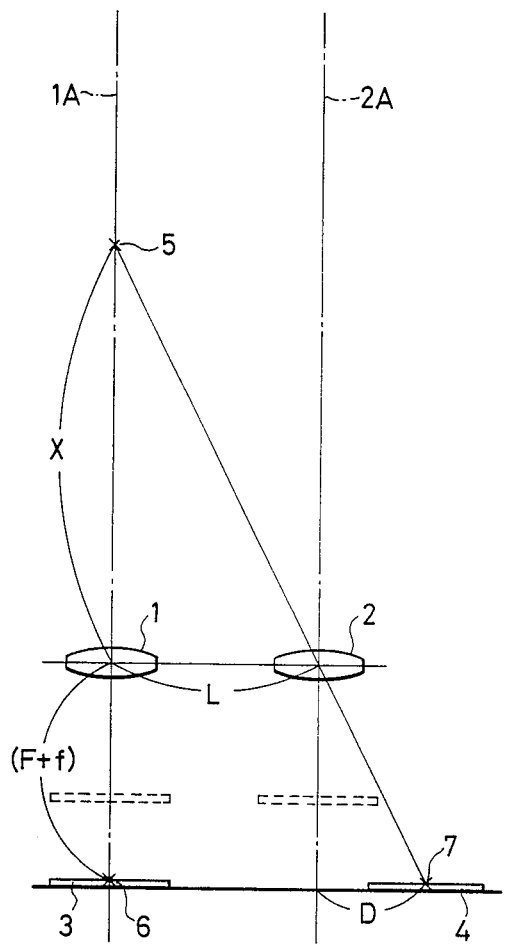
FIGS. 5, 6 and 7 show the measurement method of the present invention.

FIG. 5 shows another embodiment of the measurement method of the present invention. Like elements to those shown in FIG. 3 are designated by like numerals. In the present embodiment, the CCD array 3 is moved along the optical axis 1A and the CCD array 4 is moved obliquely to the optical axis 2A. The CCD arrays 3 and 4 are moved such that the CCD arrays 3 and 4 are always spaced from the lenses 1 and 2 in the optical axis direction by the same distance. In FIG. 5, the CCD arrays 3 and 4 which are in the same state as those in FIG. 3A are shown by broken lines. They represent the initial state. In the initial state, if the object is at an infinite point, the illumination distributions of the two CCD arrays completely match to each other.

The CCD arrays 3 and 4 are moved such that a relation $$(F+f)/(L+D) = \text{constant}$$

is met between the distances of movement f and D in FIG. 5. In this case, when the illumination distributions on the CCD arrays 3 and 4 completely match each other, the images 6 and 7 of the object 5 are focused onto the CCD arrays 3 and 4, as is derived from a lens formula.

In the present embodiment, by using (F+f) instead of F in the embodiment of FIG. 3, the distance X can be calculated in the same manner.

Figure 6:
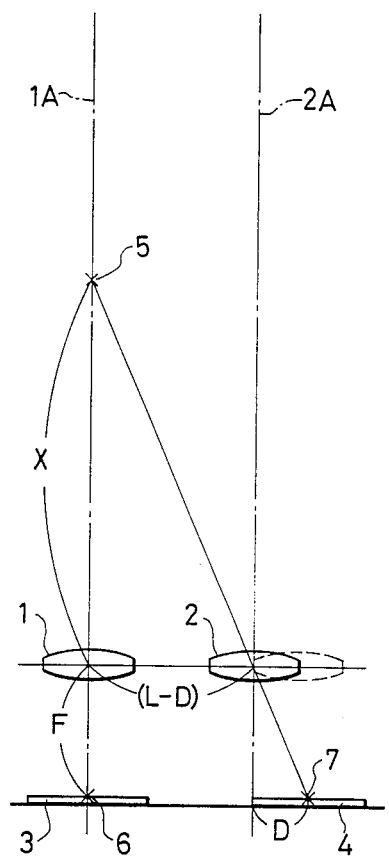

FIG. 6 shows another embodiment of the measurement method of the present invention. In the present embodiment, instead of moving the CCD array 4, the lens 2 is moved in a direction normal to the optical axis 2A to the left. In this case, (L−D) is used instead of L in the formula (1) to calculate the distance X.

Figure 7:
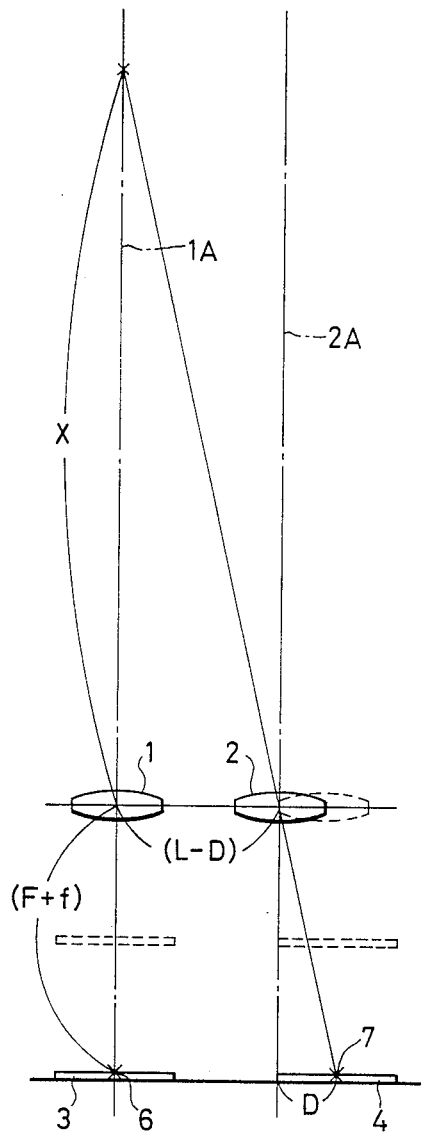

FIG. 7 shows another embodiment of the measurement method of the present invention. In the present embodiment, as the lens 2 is moved, the CCD arrays 3 and 4 are moved along the optical axes 1A and 2A. The lens 2 and the CCD array 3 and 4 are moved such that the relation $$(F+f) \times (L-D) = \text{constant}$$

is met between the distances of movement f and D of FIG. 7. In the embodiment, when the illumination distributions on the CCD arrays 3 and 4 completely match each other, the object is focused onto the CCD arrays 3 and 4 as is derived from the lens formula.

In the present embodiment, (F+f) is used instead of F in the embodiment of FIG. 6 to calculate the distance X.

In the embodiments of FIGS. 5 and 7, the images are focused onto the CCD arrays. Therefore, the contrast is high and the precision of detection of the matching of the illumination distribution is high. Accordingly, the precision of the distance measurement is improved.

In the above embodiment, the object is on the optical axis of one of the lenses. However, the present invention is also applicable when the object is off the optical axis of the lens. In this case, the distance in the optical axis direction is first calculated in the same manner as that of the above embodiments, and then a distance from the lens to the object is calculated based on an angle made between the direction of the object as viewed from the lens and the optical axis direction. Thus, the present invention allows the distance measurement in a single direction as well as multiple directions.

In the distance measurement method of the present invention, the optical axes of the two lenses are kept in parallel and at least one lens or at least one measurement means is moved, because the magnifications of the two images of one object on the line parallel to the base line of the two lenses are always equal only in such an arrangement.

In accordance with the distance measurement method of the present invention, the measurement of a wide range of distances can be attained with CCD arrays having a small number of photo-sensing elements, and the signal processing is relatively simple. Although, in the above embodiments, the focal length of lens 2 is the same as that of lens 1, the case wherein the focal lengths of lens 1 and 2 may be different from each other the same effect can be obtained.

What I claimed is:

1. A method for measuring the distance from a detecting apparatus to each of a plurality of objects, the apparatus having two optical systems which have optical axes parallel with each other, and two corresponding detecting means on which images of each object are respectively formed by said two optical systems, the optical systems and the corresponding detecting means being arranged with predetermined positional relationships therebetween, the method comprising the steps of;
   (a) obtaining correlation between illumination distributions of object images respectively formed on said two detecting means;
   (b) changing at least one of said positional relationships on the basis of the correlation obtained in step (a);
   (c) determining the change in at least one of the positional relationships between said two optical systems and said two detecting means when a desired correlation is obtained in steps (a) and (b);
   (d) determining the distance between each object and said apparatus on the basis of the change in at least one of the positional relationships determined in step (c);
   (e) performing steps (a) through (d) for each of the objects; and
   (f) storing information corresponding to the distance and direction of each object from the apparatus in a memory.

2. A method according to claim 1, wherein, in step (b), the positional relationship between said first optical system and the corresponding detecting means is fixed, and the positional relationship between said second optical system and the corresponding detecting means is changed.

3. A method according to claim 2, wherein, in step (b), the detecting means corresponding to said second optical system is moved in a direction perpendicular to an optical axis of said second optical system.

4. A method according to claim 2, wherein, in step (b), the detecting means corresponding to said second optical system is moved in a direction parallel with an optical axis of said second optical system.

5. A method according to claim 2, wherein, in step (b), the positional relationships between one of the optical systems and the two detecting means are fixed, and the other optical system is moved.

6. A method according to claim 2, wherein, in step (b), the detecting means corresponding to said second optical system is linearly moved.

7. An apparatus for measuring the distance between the apparatus and each of a plurality of objects, comprising:
   a first optical system having a first optical axis;
   a second optical system having a second optical axis parallel with the first optical axis of said first optical system;
   first detecting means on which an object image is formed by said first optical system, said first optical system and said first detecting means being arranged in a predetermined positional relationship;
   second detecting means on which an object image is formed by said second optical system, said second optical system and said second detecting means being arranged in a predetermined positional relationship;
   first means for changing at least one of the respective positional relationships between said first and second optical systems and said first and second detecting means to obtain correlation between illumination distributions of said object images respectively formed on said first and second detecting means, and for obtaining the respective positional relationships between said first and second optical systems and said first and second detecting means when a desired correlation is obtained;
   second means for determining the distance between each said object and said apparatus on the basis of the positional relationships obtained by said first means; and
   means for storing information corresponding to the distance and direction of each said object from said apparatus.

* * * * *

UNITED STATES PATENT AND TRADEMARK OFFICE
CERTIFICATE OF CORRECTION

PATENT NO. : 4,746,790
DATED : May 24, 1988
INVENTOR(S) : Kanehiro Sorimachi

It is certified that error appears in the above-identified patent and that said Letters Patent is hereby corrected as shown below:

COLUMN 1

Line 56, "respectively" should read --respectively,--.

COLUMN 2

Line 34, "on" should read --in--.

COLUMN 3

Line 27, "comprising; the steps of;" should read --comprising the steps of:--;

Line 37, "(b)" should read --(b);--; and

Line 54, "respectively" should read --respectively,--.

COLUMN 4

Line 3, "FIG. 4," should read --FIG. 4--; and

Line 40, "mal the" should read --mal to the--.

COLUMN 5

Line 32, "minimum" should read --minimum,--; and

Line 65, "to" should be deleted.

UNITED STATES PATENT AND TRADEMARK OFFICE
CERTIFICATE OF CORRECTION

PATENT NO. : 4,746,790

DATED : May 24, 1988

INVENTOR(S) : Kanehiro Sorimachi

It is certified that error appears in the above-identified patent and that said Letters Patent is hereby corrected as shown below:

COLUMN 6

Line 22, "array" should read --arrays--;

Line 65, "the case" should read --in the case--;

Line 66, "lens 1 and 2" should read --lenses 1 and 2--; and

Line 68, "claimed is" should read --claim is--.

Signed and Sealed this

Eleventh Day of July, 1989

Attest:

DONALD J. QUIGG

*Attesting Officer*      *Commissioner of Patents and Trademarks*